June 5, 1934.  W. S. SMITH ET AL  1,961,306
ELECTRICAL INSULATING MATERIAL
Filed Aug. 3, 1929
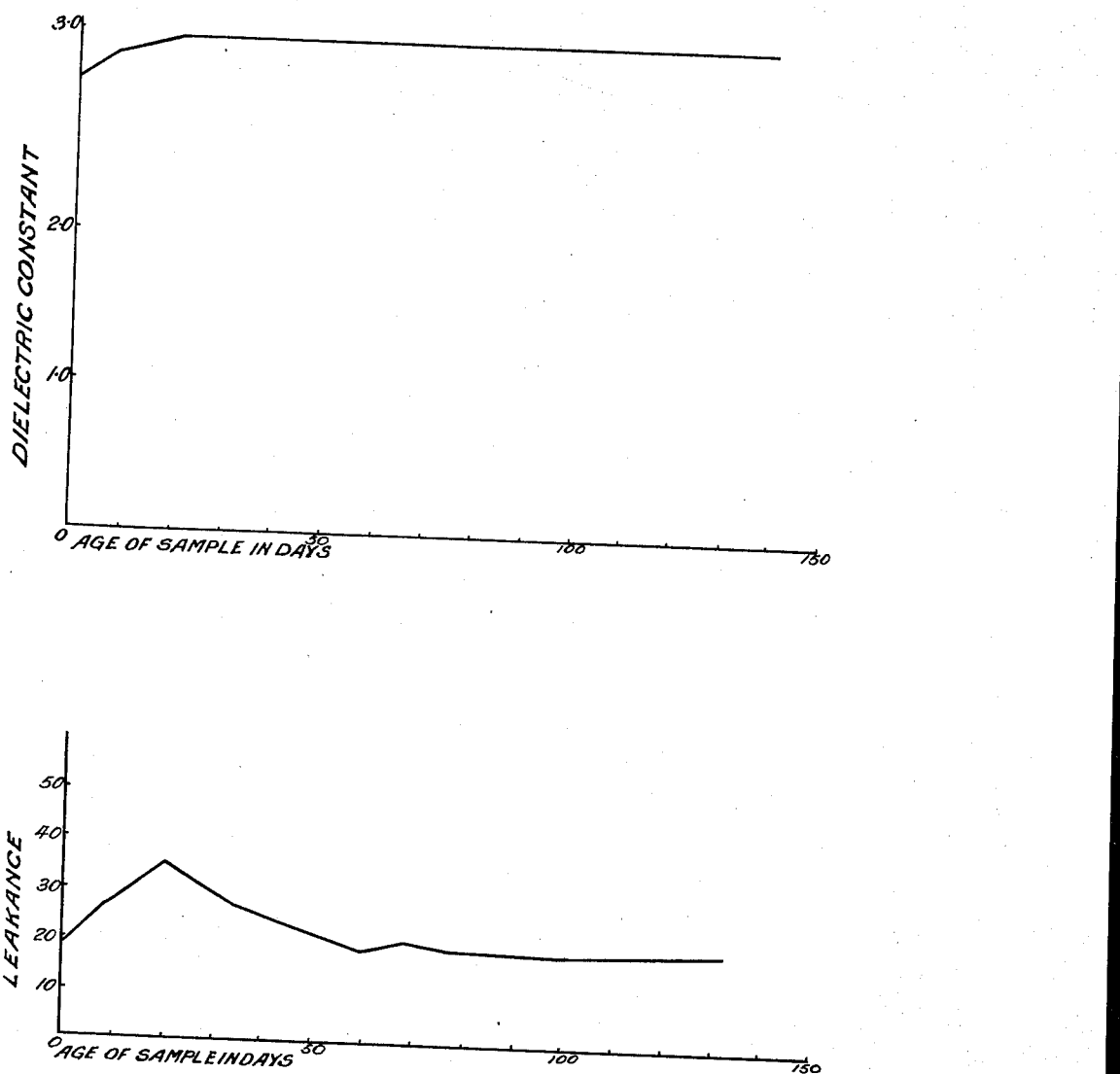
INVENTORS.
Willoughby Statham Smith,
Henry Joseph Garnett,
John Norman Dean,
Henry Charles Channon,
William Gardner,
Harold Frederick Wilson,
BY
THEIR ATTORNEYS.

Patented June 5, 1934

1,961,306

UNITED STATES PATENT OFFICE 1,961,306

ELECTRICAL INSULATING MATERIAL

Willoughby Statham Smith, Newton Poppleford, Henry Joseph Garnett, Sevenoaks, John Norman Dean, Orpington, Henry Charles Channon, South Kensington, London, William Gardner, Canonbury, London, and Harold Frederic Wilson, East Sheen, London, England Application August 3, 1929, Serial No. 383,416
In Great Britain August 25, 1928

5 Claims. (Cl. 106—13)

This invention relates to improvements in thermoplastic electrical insulating materials and the manufacture thereof, more particularly for use in the insulation of electrical conductors, such as submarine telegraph and telephone conductors.

The principal object of the invention is to provide an efficient insulating material for submarine cable conductors that is considerably cheaper than gutta percha and yet has dielectric properties superior to those of gutta percha of the normal quality.

A further object of the invention is to provide a material having mechanical properties that render it an efficient substitute for gutta percha generally.

The invention is directed to thermoplastic material which is obtained by admixing 30–40% rubber and bitumen having a high melting point not below 100° C., and a low ash and free carbon content. Suitable bitumens for admixing with rubber in accordance with the present invention are gilsonite (melting point about 130° C.), Glance pitch or Manjak (melting point about 160° C.), and Grahamite (melting point about 180° C.).

As a further feature of the invention a quantity not exceeding more than about 10% of a flux such as ceresin, candelilla, or other wax may be added at the expense of the bitumen content, and in some cases an anti-oxidant material such as tannin may also be added.

In accordance with the invention, the mixture described above preferably is applied to electrical conductors without subsequent vulcanization.

The percentage of rubber in the composition of the material may vary within limits, preferably being between thirty and forty per cent, but when other caoutchouc substances such as balata or gutta percha are also added the lower limit to the percentage of rubber may be reduced to twenty per cent or even somewhat less, in which case the balata or gutta percha is added at the expense of or mainly at the expense of the rubber content.

In manufacturing the material the object is to incorporate a substantial proportion of rubber with bitumen so intimately as to produce a homogeneous thermoplastic mass which will set solid at ordinary temperatures but will not become brittle when cooled say to sea bottom temperatures. This object may be achieved by admixing the rubber with melted bitumen but the temperature at which mixing is effected must not be so high as to harm the rubber. It has accordingly been found advantageous in certain cases to add a flux in order to lower the temperature at which the bitumen is sufficiently fluid for working its mixture with rubber in the state of a soft paste. One part by weight of a wax, for example ceresin wax or candelilla wax, to between say 5 and 7 parts by weight of the bitumen is a suitable addition for the above purpose. In some cases a volatile solvent may be employed as a flux to assist the intimate mixing, or again the bitumen may be in powdered form and masticated with the rubber at a safe temperature below the melting point of the bitumen.

The following description will illustrate by way of example various modes of carrying the invention into effect.

The bitumen or bitumen and wax is placed in a heated pfleiderer machine and melted together to form a smooth paste. The temperature of this mixture is then lowered to such a value as will keep the mixture soft and in the form of a paste, and is as low as possible so as to avoid subjecting the rubber to a higher temperature than is necessary. The rubber is then added in small portions at a time to the composition and thoroughly mixed into it. The temperature of the mixture is lowered little by little during this operation as the consistency will permit.

The material is withdrawn from the machine in a manner similar to that adopted for gutta percha.

The quantity of wax to be added is determined by the melting point of the bitumen, since if the melting point is higher than can be safely employed with rubber, it must be lowered by the addition of wax, preferably of high melting point, e. g. ceresin or candelilla wax. The process can be hastened by using the bitumen in the form of a powder.

In the process described above, the rubber is added to the bitumen paste, but where two or more machines are available, it will be found more expeditious to add the bitumen paste to the heated and preferably masticated rubber. When the material is also to contain a proportion of gutta percha, this may be added to the rubber before the latter's incorporation with the bitumen or it may be added separately afterwards.

The gutta percha or balata used should have as low a leakance and dielectric constant as possible and the proportion that may be used will be determined by these properties. Up to 10% of a gutta percha of ordinary dielectric quality may be added without materially affecting the electrical properties of the composition, while with superior quality gutta percha it has been found possible to use a much higher percentage.

It has been found that gutta percha and/or balata free from its dirt impurities and resin obtained as the result of a treatment described in the specification of our copending United States application Serial No. 322,572, filed November 28, 1928, and now United States Patent 1,912,548, of June 6, 1933, is particularly suitable for admixture with the rubber bitumen material. The proportion of purified gutta percha that may be admixed with the rubber bitumen material may be varied according to the electrical and mechanical properties desired, but preferably it is from 50-75%. In view of the fact that this rubber bitumen mixture is miscible with deresinified gutta percha and/or balata in all proportions it is clear that the relative proportions of each may be adjusted to yield the properties desired. Moreover, since this resin-free gutta percha is very hard and horny the amount of bitumen in proportion to the amount of rubber may be reduced more and more without deleterious effect as the quantity of hardened gutta percha is increased. It will thus be seen that by reducing the bitumen content a softer mixture is obtained, which however is compensated for by the addition of the hard gutta percha. A material composed of 25% of the rubber-bitumen mixture plus 75% resin and dirt free gutta percha, tested at 35° F. with an alternating current of 2000 cycles frequency gave the following results:—Dielectric constant 2.75, leakance 18 micromicromhos per cm³. The accompanying diagrams show the variation of the leakance and dielectric constant of the above mentioned mixture when kept in tap-water and tested at intervals at 35° F. and with an alternating current of 2000 cycles frequency. If the material had been kept in sea-water, the rate of increase of these electrical properties at the beginning of the test would have been less. It will be noted that after a slight rise in the early stages of the test, these electrical values settle down to a practically constant value.

Other substances, such as shellac, rosin, and other resins or waxes, may be added in small quantities to cheapen the material or modify its physical properties without seriously impairing its electrical characteristics.

The rubber bitumen material obtained by any one of the processes described above is thermoplastic, can be easily extruded at temperatures between 70° C. and 120° C., sets to a firm solid at air temperature and is not brittle at sea bottom temperature. It does not absorb water to any harmful extent and ages well. Its leakance at ordinary temperatures is equal to that of the best types of gutta percha and superior to that of the usual commercial material. At low temperatures, such as are met with in ocean depths, its leakance is unchanged, whereas it is well known that the leakance of the normal gutta percha insulation rises as the temperature is lowered. The variation of the leakance with the frequency for the new material is also lower than that for the average gutta percha. Its dielectric constant is also very low and is reasonably constant with age.

In some cases it may be advantageous to add a hardening agent, for example benzidine, or a softener, for example stearic acid, to the mixture. It may also in some cases be necessary to include antioxidants as for example tannin in the material.

These materials can be used for insulating conductors of submarine telegraph and telephone cables especially in the case of continuously loaded conductors when used in conjunction with the pressure equalizing medium described in our copending U. S. application Serial No. 303,970, filed Sept. 4, 1928, now United States Patent 1,819,720, of August 18, 1931.

The new materials can be extruded round a conductor in the same way as gutta percha with the help of the normal machines for that purpose. Moreover the new compositions possess mechanical properties such that they can be used in accordance with a further feature of this invention, as substitutes for gutta percha and the like thermoplastic material in the manufacture of articles hitherto made for mechanical reasons from gutta percha.

The following are examples illustrating particular compositions and proportions which will be found suitable to employ in carrying out the invention:—

*Example 1*

| | Percent |
|---|---|
| Para rubber | 32.5 |
| Bitumen (melting point about 130° C.) | 57.5 |
| Ceresin wax | 10.0 |
| | 100.0 |

Measurements made at 35° F. and with an alternating current having a frequency of 2000 cycles gave the following results: dielectric constant 2.7, leakance, 16.6.

*Example 2*

| | Percent |
|---|---|
| Para rubber | 35 |
| Bitumen (melting point about 130° C.) | 55 |
| Candelilla wax | 10 |
| | 100 |

Measurements made at 35° F. and with an alternating current having a frequency of 2000 cycles gave the following results: dielectric constant 2.7, leakance, 16.6.

*Example 3*

| | Percent |
|---|---|
| Para rubber | 24.4 |
| Bitumen (melting point about 130° C.) | 43.9 |
| Ceresin wax | 7.3 |
| Gutta percha of good quality | 24.4 |
| | 100.0 |

Measurements made at 35° F. and with an alternating current having a frequency of 2000 cycles gave the following results: dielectric constant, 2.8, leakance, 16.

It has been found that in some cases the insulating material may be modified by forming it of a mixture of bitumen with gutta percha, with which mixture wax may also be incorporated.

As previously stated, the melting point of the bitumen may be lowered by the addition of wax or other low melting point material that is mixable with resins, bitumens and the like.

The electrical and mechanical properties of the material are improved if instead of employing the ordinary rubber, its resins are extracted. This may be done by known methods e. g. extraction with acetone.

The rubber used for the preparation of the new insulating materials should preferably however first have been treated by one of the methods described in our copending U. S. application Serial No. 374,948, filed June 29, 1929 to remove practically all the potentially water absorbing bodies present in the rubber or synthetic rubber may be used.

It is obvious that the material can be used for other purposes than that of covering wire when insulation of a high dielectric character is required.

On account of their bitumen content and of the specially prepared rubber, the materials manufactured in accordance with the invention are particularly valuable when used in damp or wet places.

Bitumens which have been found suitable for use with the present invention have a melting point from 120°–150° C.

What we claim is:—

1. A thermoplastic material as a substitute for gutta percha suitable for use as insulation on electrical conductors comprising rubber admixed with substantially 60–70% of a bitumen having a high melting point not below about 100° C. and substantially free of ash and of free carbon.

2. A thermoplastic material as claimed in claim 1 comprising not more than 10% of a flux such as ceresin, candelilla, or other wax which is added at the expense of the bitumen content.

3. A thermoplastic material as claimed in claim 1 with the addition of gutta percha or the like which is added mainly at the expense of the rubber content.

4. A thermoplastic material as claimed in claim 1 with the addition of gutta percha or the like purified by removal of its resin and dirt impurities, which gutta percha is added mainly at the expense of the rubber content.

5. A thermoplastic electrical insulating material comprising unvulcanized rubber admixed with substantially 60–70% of a bitumen having a high melting point not below about 100° C. and substantially free of ash and of free carbon.

WILLOUGHBY STATHAM SMITH.
HENRY JOSEPH GARNETT.
HENRY CHARLES CHANNON.
JOHN NORMAN DEAN.
WILLIAM GARDNER.
HAROLD FREDERIC WILSON.